United States Patent
Lee et al.

(10) Patent No.: US 9,672,087 B2
(45) Date of Patent: Jun. 6, 2017

(54) ERROR DETECTING APPARATUS FOR GATE DRIVER, DISPLAY APPARATUS HAVING THE SAME AND METHOD OF DETECTING ERROR OF GATE DRIVER

(71) Applicant: Samsung Display Co., Ltd., Yongin (KR)

(72) Inventors: Jong-Jae Lee, Hwaseong-si (KR); Eui-Dong Hwang, Bucheon-si (KR); Bon-Sung Koo, Seongnam-si (KR); Jun-Dal Kim, Asan-si (KR); Seung-Hwan Moon, Asan-si (KR); Dong-Won Park, Asan-si (KR)

(73) Assignee: Samsung Display Co., Ltd., Yongin-si (KR)

(*) Notice: Subject to any disclaimer, the term of this patent is extended or adjusted under 35 U.S.C. 154(b) by 210 days.

(21) Appl. No.: 14/332,256

(22) Filed: Jul. 15, 2014

(65) Prior Publication Data

US 2015/0026506 A1 Jan. 22, 2015

(30) Foreign Application Priority Data

Jul. 16, 2013 (KR) ........................ 10-2013-0083373

(51) Int. Cl.
*G06F 11/00* (2006.01)
*G06F 11/07* (2006.01)
(Continued)

(52) U.S. Cl.
CPC ...... *G06F 11/0751* (2013.01); *G06F 11/0706* (2013.01); *G09G 3/2096* (2013.01); *G09G 3/3674* (2013.01); *G09G 2310/0267* (2013.01)

(58) Field of Classification Search
IPC .................................................... G09G 3/2096
See application file for complete search history.

(56) References Cited

U.S. PATENT DOCUMENTS

| 5,610,887 A | * | 3/1997 | Arai | ..................... | G11B 7/0903 |
| | | | | | 369/44.25 |
| 7,134,042 B2 | * | 11/2006 | Shimasaki | ............. | G01R 23/15 |
| | | | | | 327/47 |

(Continued)

FOREIGN PATENT DOCUMENTS

| JP | 2006-098639 | 4/2006 |
| JP | 2010217344 | 9/2010 |

(Continued)

*Primary Examiner* — Amine Riad
(74) *Attorney, Agent, or Firm* — H.C. Park & Associates, PLC

(57) ABSTRACT

Exemplary embodiments of present invention relate to an error detecting apparatus for a gate driver improving a reliability of a display apparatus, a display apparatus having the error detecting apparatus, and a method of detecting an error of the gate driver using the error detecting apparatus. An exemplary embodiment discloses an error detecting apparatus including an error detecting part configured to receive a gate signal of a gate driver and determine whether a status of the gate driver is in a normal status or an error status based on the gate signal, a memory configured to store the status of the gate driver, and a signal outputting part configured to selectively output a clock signal and an error signal based on the status of the gate driver stored in the memory.

19 Claims, 10 Drawing Sheets

(51) Int. Cl.
  *G09G 3/20* (2006.01)
  *G09G 3/36* (2006.01)

(56) References Cited

U.S. PATENT DOCUMENTS

| | | | |
|---|---|---|---|
| 7,893,912 B2* | 2/2011 | Kim | G09G 3/3611 345/98 |
| 8,149,204 B2 | 4/2012 | Lim | |
| 2004/0177290 A1* | 9/2004 | Shimasaki | G01R 23/15 714/700 |
| 2005/0195151 A1* | 9/2005 | Ko | G09G 3/006 345/100 |
| 2007/0159438 A1 | 7/2007 | Cho | |
| 2008/0309605 A1 | 12/2008 | Jang et al. | |
| 2011/0148841 A1* | 6/2011 | Yeo | G09G 3/3688 345/211 |
| 2012/0044001 A1* | 2/2012 | Tanaka | H03L 7/235 327/156 |
| 2014/0347103 A1* | 11/2014 | Snook | H03K 17/0828 327/109 |
| 2015/0026506 A1* | 1/2015 | Lee | G06F 11/0706 714/3 |
| 2015/0153794 A1* | 6/2015 | Choi | G06F 1/26 713/300 |
| 2015/0371584 A1* | 12/2015 | Lin | G11C 19/28 345/214 |
| 2016/0055829 A1* | 2/2016 | Lin | G09G 5/18 345/213 |

FOREIGN PATENT DOCUMENTS

| | | |
|---|---|---|
| KR | 1020070071258 | 7/2007 |
| KR | 1020080035086 | 4/2008 |
| KR | 1020080083960 | 9/2008 |
| KR | 1020110075494 | 7/2011 |
| KR | 1020120041043 | 4/2012 |
| KR | 1020120110658 | 10/2012 |

* cited by examiner

ERROR DETECTING APPARATUS FOR GATE DRIVER, DISPLAY APPARATUS HAVING THE SAME AND METHOD OF DETECTING ERROR OF GATE DRIVER

CROSS REFERENCE TO RELATED APPLICATION

This application claims priority from and the benefit of Korean Patent Application No. 10-2013-0083373, filed on Jul. 16, 2013, in the Korean Intellectual Property Office KIPO, which is hereby incorporated by reference for all purposes as if fully set forth herein.

BACKGROUND

Field

Exemplary embodiments of the present invention relate to an error detecting apparatus for a gate driver which improves reliability of a display apparatus, a display apparatus having the error detecting apparatus and a method of detecting an error of the gate driver using the error detecting apparatus.

Discussion of the Background

In general, a liquid crystal display ("LCD") apparatus includes a first substrate including a pixel electrode, a second substrate including a common electrode and a liquid crystal layer disposed between the first substrate and the second substrate. Alternatively, an LCD apparatus includes a first substrate including a pixel electrode and a common electrode, a second substrate facing the first substrate and a liquid crystal layer disposed between the first substrate and the second substrate. An electric field is generated by voltages applied to the pixel electrode and the common electrode. A desired image may be displayed by adjusting intensity of the electric field, modifying transmittance of the liquid crystal layer which light passes through.

The liquid crystal display apparatus includes a display panel and a panel driver. The panel driver includes a gate driver driving a gate line of the display panel and a data driver driving a data line of the display panel.

The gate driver generates a gate signal. The gate driver sequentially applies the gate signal to the gate line. When a gate signal error is generated, the display panel may not display the desired image.

In general, the gate signal error is inspected by monitoring an image displayed on the display panel with inspector's naked eye; hence, gate signal error may occasionally be overlooked and not be detected.

Moreover, the defective gate driver may be integrated on to the display panel. In such case, the manufactured display panel becomes defective when the gate signal error is not detected, decreasing the reliability of the display apparatus.

SUMMARY

Exemplary embodiments of the present invention provide an error detecting apparatus for a gate driver improving a reliability of a display apparatus.

Exemplary embodiments of the present invention provide a display apparatus having the error detecting apparatus.

Exemplary embodiments of the present invention also provide a method of detecting an error of the gate driver using the error detecting apparatus.

Additional features of the invention will be set forth in the description which follows, and in part will be apparent from the description, or may be learned by practice of the invention.

An exemplary embodiment of the present invention discloses an error detecting apparatus including an error detecting part configured to receive a gate signal of a gate driver and determine whether a status of the gate driver is in a normal status or an error status based on the gate signal, a memory configured to store the status of the gate driver determined by the error detecting part, and a signal outputting part configured to selectively output a clock signal and an error signal based on the status of the gate driver stored in the memory.

An exemplary embodiment of the present invention discloses a display apparatus including a display panel comprising a gate line, a data line, and a pixel, a gate driver configured to apply a gate signal to the gate line, an error detecting apparatus comprising an error detecting part configured to receive the gate signal and determine whether a status of the gate driver is in a normal status or an error status based on the gate signal, a memory configured to store the status of the gate driver determined by the error detecting part, and a signal outputting part configured to selectively output a clock signal and an error signal based on the status of the gate driver stored in the memory.

An exemplary embodiment of the present invention also discloses a method of detecting an error of a gate driver, the method including determining whether a status of the gate driver is a normal status or an error status based on a gate signal of the gate driver, storing the status of the gate driver at a memory, and selectively outputting a clock signal and an error signal based on the status of the gate driver stored in the memory.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
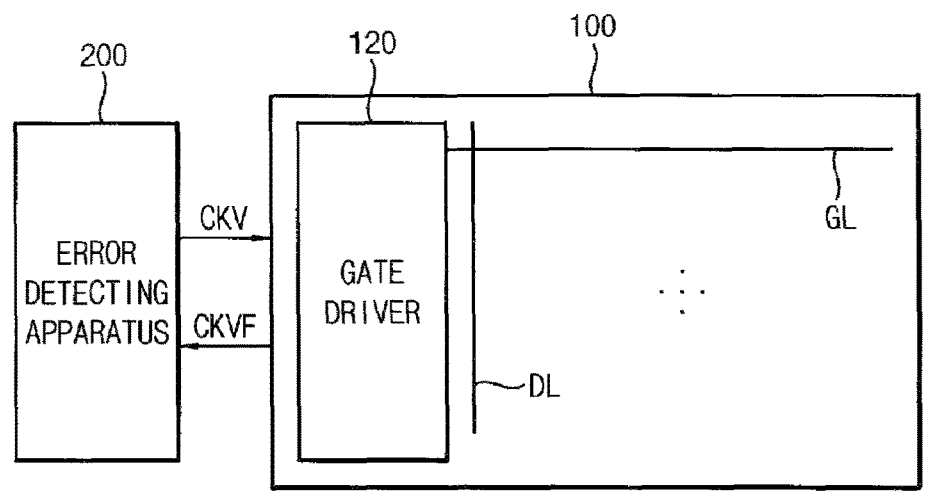
FIG. 1 is a block diagram illustrating a display panel, a gate driver, and an error detecting apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIG. 1 is a block diagram illustrating a display panel 100, a gate driver 120 and an error detecting apparatus 200, according to an exemplary embodiment of the present invention.

Referring to FIG. 1, the display panel 100 displays an image. The display panel 100 has a display region on which the image is displayed, and a peripheral region adjacent to the display region.

The display panel 100 includes a plurality of gate lines GL, a plurality of data lines DL and a plurality of unit pixels connected to the gate lines GL and the data lines DL. The gate lines GL extend in a first direction D1 and the data lines DL extend in a second direction D2 crossing the first direction D1. Each unit pixel may include a switching element, a liquid crystal capacitor and a storage capacitor. The liquid crystal capacitor and the storage capacitor are electrically connected to the switching element. The unit pixels may be disposed in a matrix form.

The gate driver 120 generates gate signals driving the gate lines GL. The gate driver 120 sequentially outputs the gate signals to the gate lines GL.

The gate driver 120 may be integrated on the peripheral region of the display panel 100. Alternatively, the gate driver 120 may be directly mounted on the display panel 100. The gate driver 120 may also be connected to the display panel 100 as a tape carrier package (TCP) type. In short, the gate driver 120 may be provided in any suitable arrangement that allows it to operate as a gate driver.

The error detecting apparatus 200 determines a status of the gate driver 120. Statuses of the gate driver 120 include a normal status and an error status.

The error detecting apparatus 200 outputs a clock signal CKV to the gate driver 120. The error detecting apparatus 200 receives the gate signal CKVF from the gate driver 120 to determine the status of the gate driver 120.

In one exemplary embodiment, the error detecting apparatus 200 may be formed independently from the display apparatus as an inspecting apparatus for detecting the error of the gate driver 120. In another exemplary embodiment, the error detecting apparatus 200 may be an element of the display apparatus.

According to the present exemplary embodiment, the error detecting apparatus 200 for the gate driver 120 directly receives the signal of the gate driver to detect the error status of the gate driver 120, improving the reliability of the display apparatus.

Figure 2:
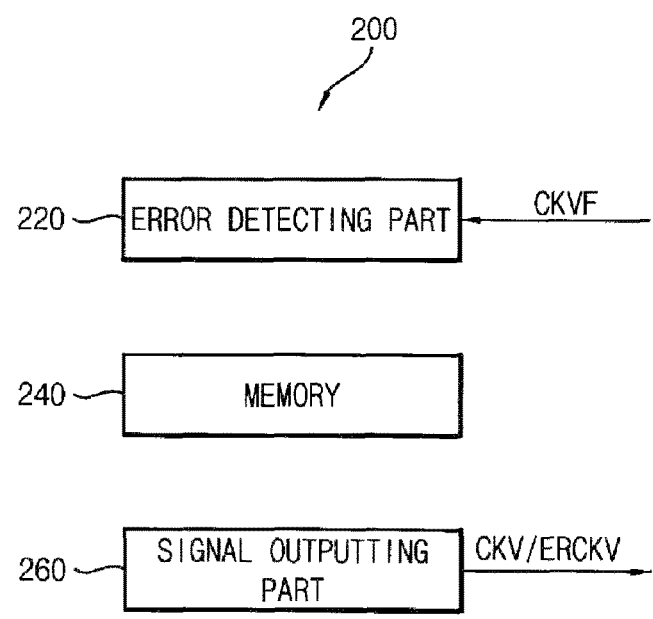
FIG. 2 is a block diagram illustrating the error detecting apparatus of FIG. 1.
Figure 3:
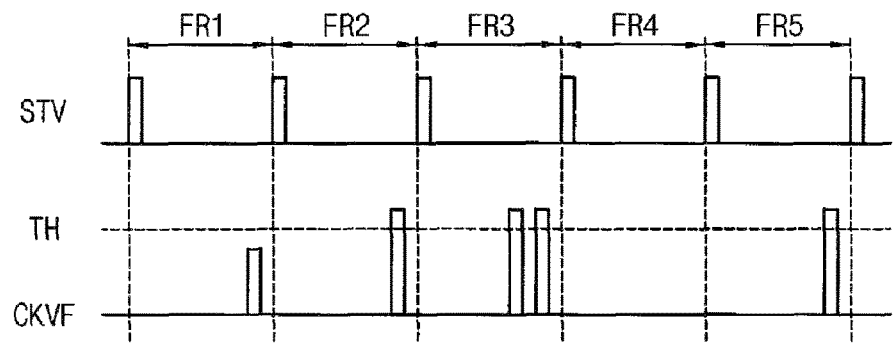
FIG. 3 is a conceptual diagram illustrating a method of detecting an error in respective frames by an error detecting part of FIG. 2.

FIG. 2 is a block diagram illustrating the error detecting apparatus 200 of FIG. 1. FIG. 3 is a conceptual diagram illustrating a method of detecting an error in respective frames by an error detecting part 220 of FIG. 2.

Referring to FIGS. 1 to 3, the error detecting apparatus 200 includes an error detecting part 220, a memory 240, and a signal outputting part 260.

In exemplary embodiments, the gate driver 120, the error detecting apparatus 200, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to exemplary embodiments, the features, functions, and/or processes described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the gate driver 120, the error detecting apparatus 200, and/or one or more components thereof may include or otherwise be associated with one or more memories (not shown) including code (e.g., instructions) configured to cause the gate driver 120, the error detecting apparatus 200, and/or one or more components thereof to perform one or more of the features, functions, and/or processes described herein.

The memories may be any medium that participates in providing code/instructions to the one or more software, hardware, and/or firmware components for execution. Such memories may take many forms, including but not limited to non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

The error detecting part 220 receives the gate signal CKVF from the gate driver 120, and monitors the status of the gate driver 120 based on the gate signal CKVF.

The error detecting part 220 may also determine whether the error detecting apparatus 200 is connected to the gate driver 120. If the error detecting apparatus 200 detects that it is connected to the gate driver 120, the error detecting part 220 determines the status of the gate driver 120. On the other hand, if the error detecting apparatus 200 detects that it is not connected to the gate driver 120, the error detecting part 220 does not determine the status of the gate driver 120. In one exemplary embodiment, the error detecting part 220 may monitor the gate signal CKVF during a plurality of frames (e.g. 8 frames) to monitor whether the error detecting apparatus 200 is connected to the gate driver 120.

The error detecting part 220 may determine that the gate signal CKVF is a normal signal when it detects a single pulse exceeding a threshold voltage TH from the gate signal CKVF of the gate driver 120. On the other hand, the error detecting part 220 may determine that the gate signal CKVF is an error signal when none of the gate signals CKVF exceeds the threshold voltage TH. The error detecting part 220 also may determine that the gate signal CKVF is an error signal when it detects a plurality of pulses that exceeds the threshold voltage TH from the gate signal CKVF.

Referring to FIG. 3, in the first frame FR1, the gate signal CKVF does not exceed the threshold voltage TH. Thus, the gate signal CKVF of the first frame FR1 is an error signal. Both gate signals CKVF of the second frame FR2 and the fifth frame FR5 exceeds the threshold voltage TH. Thus, both gate signals CKVF of the second frame FR2 and the fifth frame FR5 are normal signals. The gate signal CKVF of the third frame FR3, on the other hand, exceeds the threshold voltage TH. However, the gate signal CKVF has two pulses that exceed the threshold voltage TH. Thus, the gate signal CKVF of the third frame FR3 is an error signal. Finally, the gate signal CKVF of the fourth frame FR4 has no pulse. Thus, the gate signal CKVF of the fourth frame FR4 is an error signal.

The error detecting part 220 may determine that the gate driver 120 is in the error status when the number of normal gate signals from the gate driver 120 is less than a threshold normal value within a number of frames. Alternatively, the error detecting part 220 may determine that the gate driver 120 is in the error status when the number of the error signals within a number of frames is equal to or greater than a threshold error value.

In one exemplary embodiment, the error detecting part 220 may have 32 frames for number of frames, and 5 for the threshold error value. In the exemplary embodiment, the error detecting part 220 will determine that the gate driver 120 is in the error status if the number of error frames having the error signal of the gate signal CKVF is equal to or greater than 5. The error detecting part 220 will determine that the gate driver 120 is in the normal status if the number of the error frames having the error signal of the gate signal CKVF is less than five.

When the error detecting part 220 detects that the gate driver 120 is in the error status, the error detecting part 220 will stop the error detecting operation. On the other hand, when the error detecting part 220 detects that the gate driver 120 is in the normal status, the error detecting part 220 will continue the error detecting operation.

The memory 240 stores the status of the gate driver 120 determined by the error detecting part 220. In the present exemplary embodiment, for example, a flag value of 0 can be stored to the memory to represent the normal status of the gate driver 120, and a flag value of 1 can be stored to the memory to represent the error status. The memory 240 may be a non-volatile memory, and does not lose the stored flag value in accordance with the status of the gate driver 120 even when the error detecting apparatus 200 is turned off. In one exemplary embodiment, the memory 240 may be electrically erasable and programmable read-only memory (EEPROM).

The signal outputting part 260 may selectively output a clock signal CKV and an error signal ERCKV, based on the flag value of the memory 240 representing the status of the gate driver 120.

In a normal status, the signal outputting part 260 outputs the clock signal CKV to the gate driver 120. When the clock signal CKV is provided to a stage of the gate driver 120, the stage of the gate driver 120 generates a gate signal based on the clock signal CKV and outputs the gate signal to the gate line GL of the display panel 100.

On the other hand, in an error status, the signal outputting part 260 outputs the error signal ERCKV to the gate driver 120. In the present exemplary embodiment, the error signal ERCKV has a frequency less than that of the clock signal CKV. In one exemplary embodiment, within a cycle of the number of frames, the error signal ERCKV may have clock signal for only a part of the cycle. In other words, throughout the cycle of the number of frames, the error signal ERCKV may have clock pulses for some frames, but not for other frames. Accordingly, the display panel 100 may display a blinking image when the signal outputting part 260 outputs the error signal ERCKV, so that the inspector may easily detect the error status of the gate driver 120.

Figure 4:
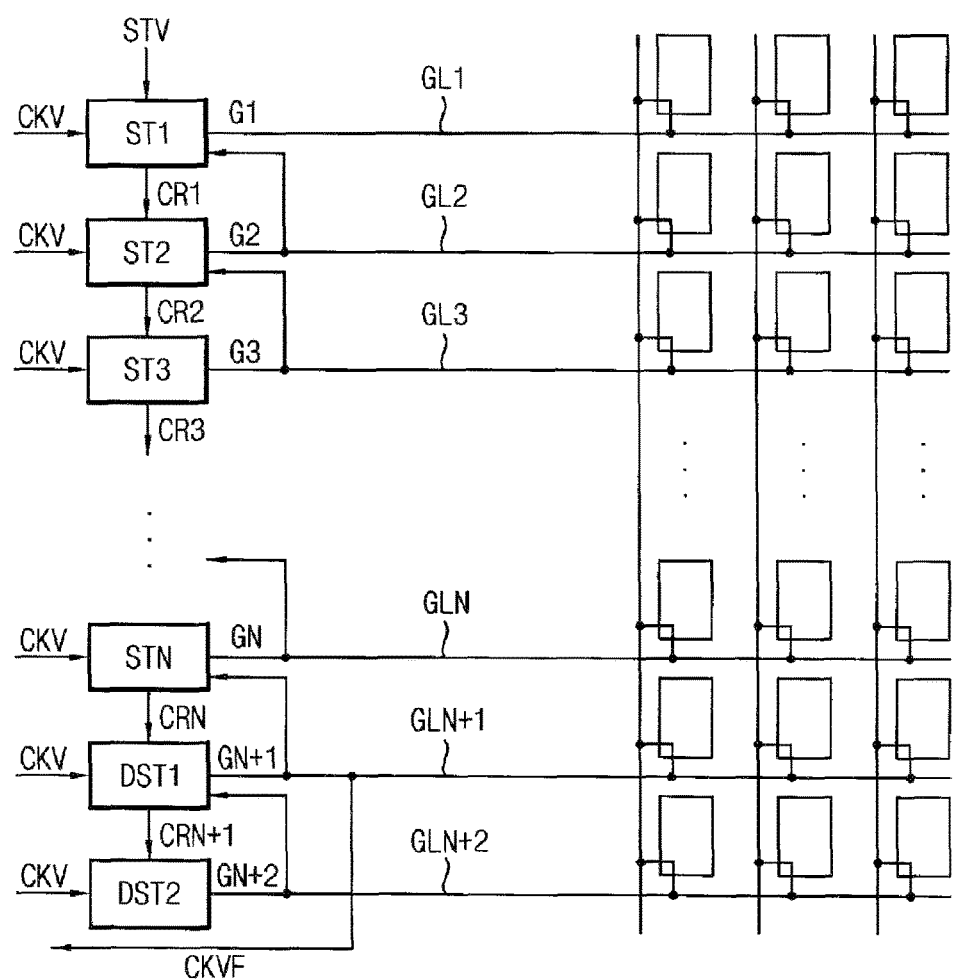
FIG. 4 is a block diagram illustrating stages of the gate driver of FIG. 1.

FIG. 4 is a block diagram illustrating stages of the gate driver 120 of FIG. 1.

Referring to FIGS. 1 to 4, the gate driver 120 may include plurality of the stages from a first stage ST1 to an N-th stage STN, wherein N is a positive integer. The plurality of the stages is connected to pixels of the display panel 100 through the plurality of the gate lines, from a first gate line GL1 to an N-th gate line GLN.

The first stage ST1 receives a vertical start signal STV and the clock signal CKV. The first stage ST1 generates a first gate signal G1 and a first carry signal CR1 based on the vertical start signal STV and the clock signal CKV. The first stage ST1 outputs the first gate signal G1 to a first gate line GL1 of the display panel 100. The first stage ST1 outputs the first carry signal CR1 to a second stage ST2.

The second stage ST2 receives the first carry signal CR1 and the clock signal CKV. The second stage ST2 generates a second gate signal G2 and a second carry signal CR2 based on the first carry signal CR1 and the clock signal CKV. The second stage ST2 outputs the second gate signal G2 to a second gate line GL2 of the display panel 100. The second stage ST2 outputs the second carry signal CR2 to a third stage ST3. The second stage ST2 also outputs the second gate signal G2 to the first stage ST1 to pull down the first gate signal G1 of the first stage ST1.

The third stage ST3 receives the second carry signal CR2 and the clock signal CKV. The third stage ST3 generates a third gate signal G3 and a third carry signal CR3 based on the second carry signal CR2 and the clock signal CKV. The third stage ST3 outputs the third gate signal G3 to a third gate line GL3 of the display panel 100. The third stage ST3 outputs the third carry signal CR3 to a fourth stage. The third stage ST3 also outputs the third gate signal G3 to the second stage ST2 to pull down the second gate signal G2 of the second stage ST2.

The gate driver 120 may further include at least a first dummy stage DST1 and a second dummy stage DST2. The first dummy stage DST1 and the second dummy stage DST2 are connected to non-displaying pixels through an (N+1)-th gate line GLN+1 and an (N+2)-th gate line GLN+2 of the display panel 100. The non-displaying pixels of the display panel 100 do not display any image. Alternatively, the non-displaying pixels of the display panel 100 may display an image, but the image on the non-displaying pixels may be blocked by a light blocking pattern to hide the image on the non-displaying pixels.

The N-th stage STN receives an (N−1)-th carry signal and the clock signal CKV. The N-th stage STN generates an N-th gate signal GN and an N-th carry signal CRN based on the (N−1)-th carry signal and the clock signal CKV. The N-th stage STN outputs the N-th gate signal GN to an N-th gate line GLN of the display panel 100. The N-th stage STN outputs the N-th carry signal CRN to a first dummy stage DST1. The N-th stage STN also outputs the N-th gate signal GN to an (N−1)-th stage (not shown) to pull down an (N−1)-th gate signal of the (N−1)-th stage.

The first dummy stage DST1 receives the N-th carry signal CRN and the clock signal CKV. The first dummy stage DST1 generates an (N+1)-th gate signal GN+1 and an (N+1)-th carry signal CRN+1 based on the N-th carry signal CRN and the clock signal CKV. The first dummy stage DST1 outputs the (N+1)-th gate signal GN+1 to an (N+1)-th gate line GLN+1 of the display panel 100. The first dummy stage DST1 outputs the (N+1)-th carry signal CRN+1 to a second dummy stage DST2. The first dummy stage DST1 also outputs the (N+1)-th gate signal GN+1 to the N-th stage STN to pull down the N-th gate signal GN of the N-th stage STN.

The second dummy stage DST2 receives the (N+1)-th carry signal CRN+1 and the clock signal CKV. The second dummy stage DST2 generates an (N+2)-th gate signal GN+2 and an (N+2)-th carry signal CRN+2 based on the (N+1)-th carry signal CRN+1 and the clock signal CKV. The second dummy stage DST2 outputs the (N+2)-th gate signal GN+2 to an (N+2)-th gate line GLN+2 of the display panel 100. The second dummy stage DST2 also outputs the (N+2)-th gate signal GN+2 to the first dummy stage DST1 to pull down the (N+1)-th gate signal GN+1 of the first dummy stage DST1.

The error detecting part 220 may receive the gate signal of the dummy stage of the gate driver 120. The error detecting part 220 may determine the status of the gate driver 120 based on the gate signal of the dummy stage of the gate driver 120, other than the last dummy stage of the gate driver 120.

The error detecting part 220 may not receive any gate signal from the first stage ST1 to the N-th stage of the gate driver 120 that are connected to the displaying pixel, because the gate signals G1 to GN may be distorted due to a signal coupling, hence, the image on the displaying pixel may be deteriorated. The error detecting part 220 also may not receive the gate signal of the last dummy stage, because there is no next stage to pull down the gate signal of the last dummy stage, decreasing the reliability in detecting the error.

In the present exemplary embodiment, the error detecting part 220 receives a gate signal GN+1 of the first dummy stage DST1 of the gate driver 120 as the gate signal CKVF to determine the status of the gate driver 120.

The gate driver 120 described above includes two dummy stages merely as an example. That is, the gate driver 120 may include any number of dummy stages which is more than two. The error detecting part 220 may determine the status of the gate driver 120 based on the gate signal of any dummy stage of the gate driver 120, other than the last dummy stage. For example, when the gate driver 120 includes three dummy stages disposed sequentially, the error detecting part 220 may determine the status of the gate driver 120 based on the gate signal of either the first or second dummy stages, or in some cases, may determine the status of the gate driver based on gate signals from both the first and second dummy stages.

Figure 5A:
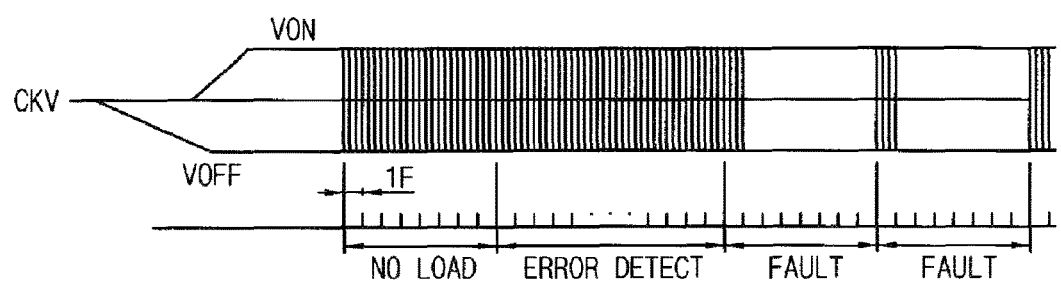
FIG. 5A is a timing diagram illustrating an output signal of a signal outputting part of FIG. 2 in a turn on status of the error detecting apparatus of FIG. 2 detecting the error.
Figure 5B:
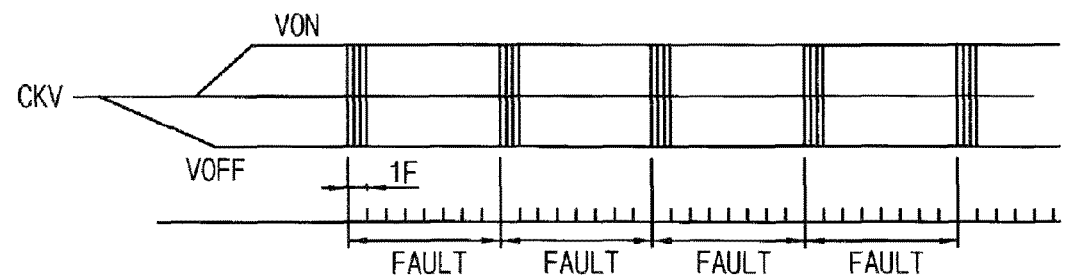
FIG. 5B is a timing diagram illustrating an output signal of the signal outputting part of FIG. 2 when the error detecting apparatus of FIG. 2 is turned off and turned on again after the error detecting apparatus detects the error.

FIG. 5A is a timing diagram illustrating an output signal of a signal outputting part 260 of FIG. 2 in a turn on status of the error detecting apparatus of FIG. 2 detecting the error. FIG. 5B is a timing diagram illustrating an output signal of the signal outputting part of FIG. 2 when the error detecting apparatus of FIG. 2 is turned off and turned on again after the error detecting apparatus detects the error.

Referring to FIG. 5A, when the error detecting apparatus 200 is first turned on, the error detecting part 220 may determine whether the error detecting apparatus 200 is connected to the gate driver 120 for a duration of number of frames; a NO LOAD duration). In present exemplary embodiment, the NO LOAD duration is eight frames. During the NO LOAD duration, the signal outputting part 260 continuously and normally outputs the clock signal CKV. When the error detecting apparatus 200 is not connected to the gate driver 120, the error detecting part 220 does not monitor the status of the gate driver 120.

When the error detecting apparatus 200 is connected to the gate driver 120, the error detecting part 220 monitors the status of the gate driver 120 for a duration of number of frames; an ERROR DETECT duration. In present exemplary embodiment, the ERROR DETECT duration is 32 frames. During the ERROR DETECT duration, the signal outputting part 260 continuously and normally outputs the clock signal CKV.

When the error detecting part 220 detects that the gate driver 120 is in the error status (a FAULT duration), the signal outputting part 260 outputs the error signal ERCKV, and the flag value of the memory 240 is changed from 0 to 1, representing the error status. Referring to FIG. 5A, the present exemplary embodiment of the error signal ERCKV has clock pulses for one frame and VOFF level for the other seven frames, and the error signal ERCKV will have a frequency equal to ⅛ of the clock signal CKV frequency. Thus, the inspector may easily detect the error status of the gate driver 120 from detecting a blinking image on the display panel 100.

Referring to FIG. 5B, when the error detecting apparatus 200 is turned back on again after the error detecting apparatus 200 detected an error, the memory 240 is a non-volatile memory and maintains the flag value of 0 representing the error status of the gate driver 120. Thus, the error detecting apparatus 200 will keep outputting the error signal ERCKV.

Figure 6:
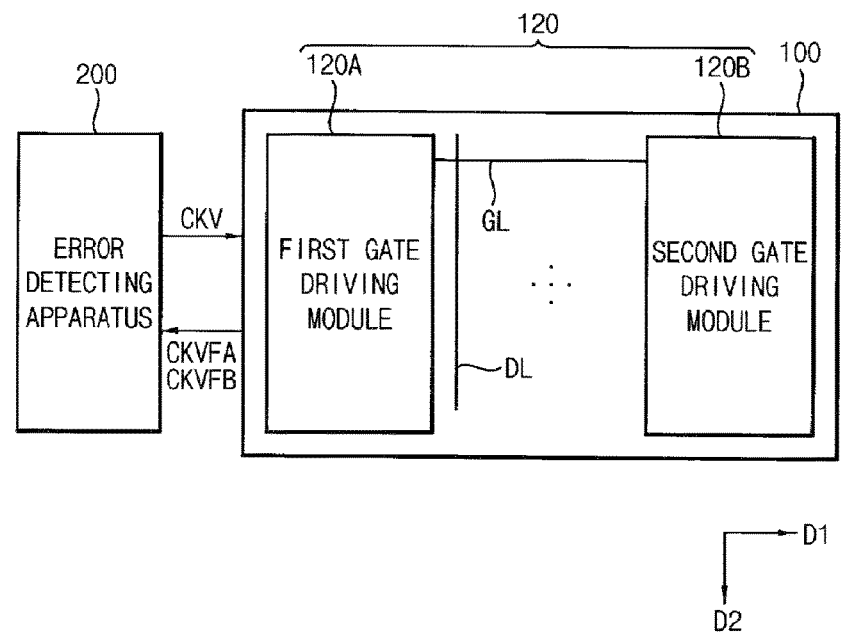
FIG. 6 is a block diagram illustrating a display panel, a gate driver, and an error detecting apparatus according to an exemplary embodiment of the present invention.

FIG. 6 is a block diagram illustrating a display panel, a gate driver, and an error detecting apparatus according to an exemplary embodiment of the present invention.

The display panel, the gate driver, the error detecting apparatus and the method of detecting an error according to the present exemplary embodiment are substantially the same as the display panel, the gate driver, the error detecting apparatus, and the method of detecting an error of the previous exemplary embodiment explained referring to FIGS. 1 to 5B except that the gate driver includes a first gate driving module and a second gate driving module. Thus, the same reference numerals will be used to refer to the same or like parts as those described in the previous exemplary embodiment of FIGS. 1 to 5B and any repetitive explanation concerning the above elements will be omitted.

Referring to FIG. 6, the display panel 100 displays an image. The display panel 100 has a display region on which the image is displayed and a peripheral region adjacent to the display region.

The display panel 100 includes a plurality of gate lines GL, a plurality of data lines DL and a plurality of unit pixels connected to the gate lines GL and the data lines DL. The gate lines GL extend in a first direction D1 and the data lines DL extend in a second direction D2 crossing the first direction D1.

The gate driver 120 includes a first gate driving module 120A and a second gate driving module 120B. The first gate driving module 120A is disposed in one side of the display panel 100, and the second gate driving module 120B is disposed in the opposite side of the display panel 100. The first gate driving module 120A is connected to a first end of the gate line GL. The second gate driving module 120B is connected to a second end of the gate line GL.

The first gate driving module 120A and the second gate driving module 120B generate gate signals driving the gate lines GL and sequentially output the gate signals to the gate lines GL.

The gate driver 120, including the first gate driving module 120A and second gate driving module 120B may be provided in any suitable arrangement that allows it to operate as a gate driver. In the present exemplary embodiment, the first and second gate driving modules 120A and 120B may be integrated on the peripheral region of the display panel 100.

The error detecting apparatus 200 determines the status of the gate driver 120 by monitoring both gate driving modules 120A and 120B. Statuses for the gate driver 120 include a normal status and an error status.

The error detecting apparatus 200 outputs a clock signal CKV to the gate driving modules 120A and 120B. The error detecting apparatus 200 receives a gate signal CKVFA from the first gate driving module 120A, and a gate signal CKVFB from the second gate driving module 120B to determine the status of the gate driver 120.

Figure 7:
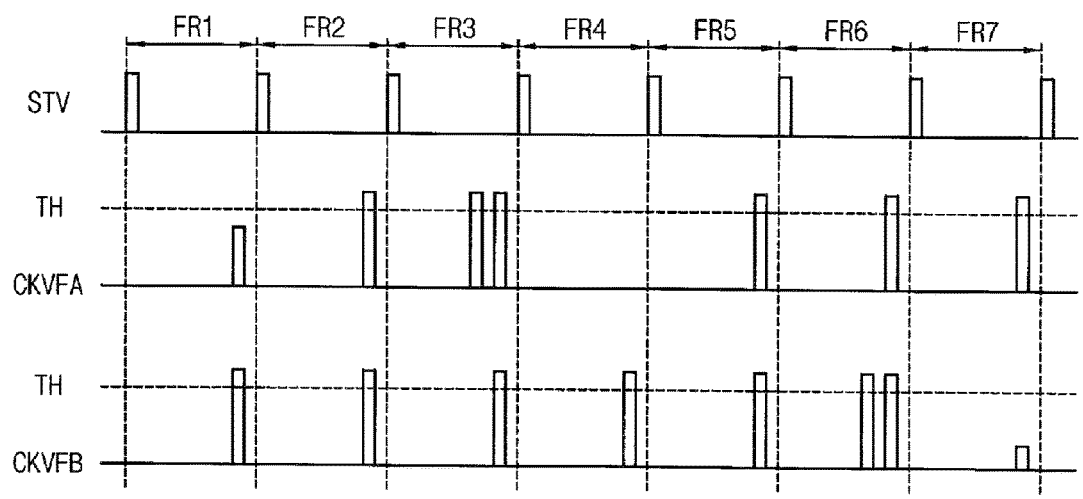
FIG. 7 is a conceptual diagram illustrating a method of detecting an error in respective frames by an error detecting part of the error detecting apparatus of FIG. 6.

FIG. 7 is a conceptual diagram illustrating a method of detecting an error in respective frames by an error detecting part of the error detecting apparatus 200 of FIG. 6.

Referring to FIGS. 2, 6 and 7, the error detecting apparatus 200 includes an error detecting part 220, a memory 240, and a signal outputting part 260. The error detecting part 220 receives the gate signal CKVFA from the first gate driving module 120A and the gate signal CKVFB from the second gate driving module 120B, and monitors the status of the gate driver 120 based on the gate signals CKVFA and CKVFB.

The error detecting part 220 may determine that the gate signal from the gate driver 120 is an error signal when at least one of the gate signals CKVFA and CKVFB from the gate driving modules 120A and 120B is an error signal, because the gate driver 120 including both gate driving unites 120A and 120B should be determined is defective if either one of the gate driving module 120A or 120B is in the error status.

Referring to the FIG. 7, in the first frame FR1, third frame FR3, fourth frame FR4, the gate signal CKVFA of the first gate driving module 120A is an error signal and the gate signal CKVFB of the second gate driving module 120B is a normal signal. Therefore, the error detecting part 220 may determine that the gate signal from the gate driver 120 is an error signal.

Referring to the sixth frame FR6 and seventh frame FR7 of FIG. 7, the gate signal CKVFA of the first gate driving module 120A is a normal signal but the gate signal CKVFB of the second gate driving module 120B is an error signal. Therefore, the error detecting part 220 will determine that the gate signal of the gate driver 120 is in an error signal.

Referring to the second frame FR2 and fifth frame FR5 of FIG. 7, both of the gate signal CKVFA of the first gate driving module 120A and the gate signal CKVFB of the second gate driving module 120B are normal signals. Therefore, the error detecting part 220 will determine that the gate signal from the gate driver 120 is a normal signal.

The error detecting part 220 may determine that the gate driver 120 is in the error status when the number of normal gate signals from the gate driver 120 is less than a threshold value within a number of frames. Alternatively, the error detecting part 220 may determine that the gate driver 120 is in the normal status when the number of normal gate signals is equal to or greater than a threshold error value.

Figure 8:
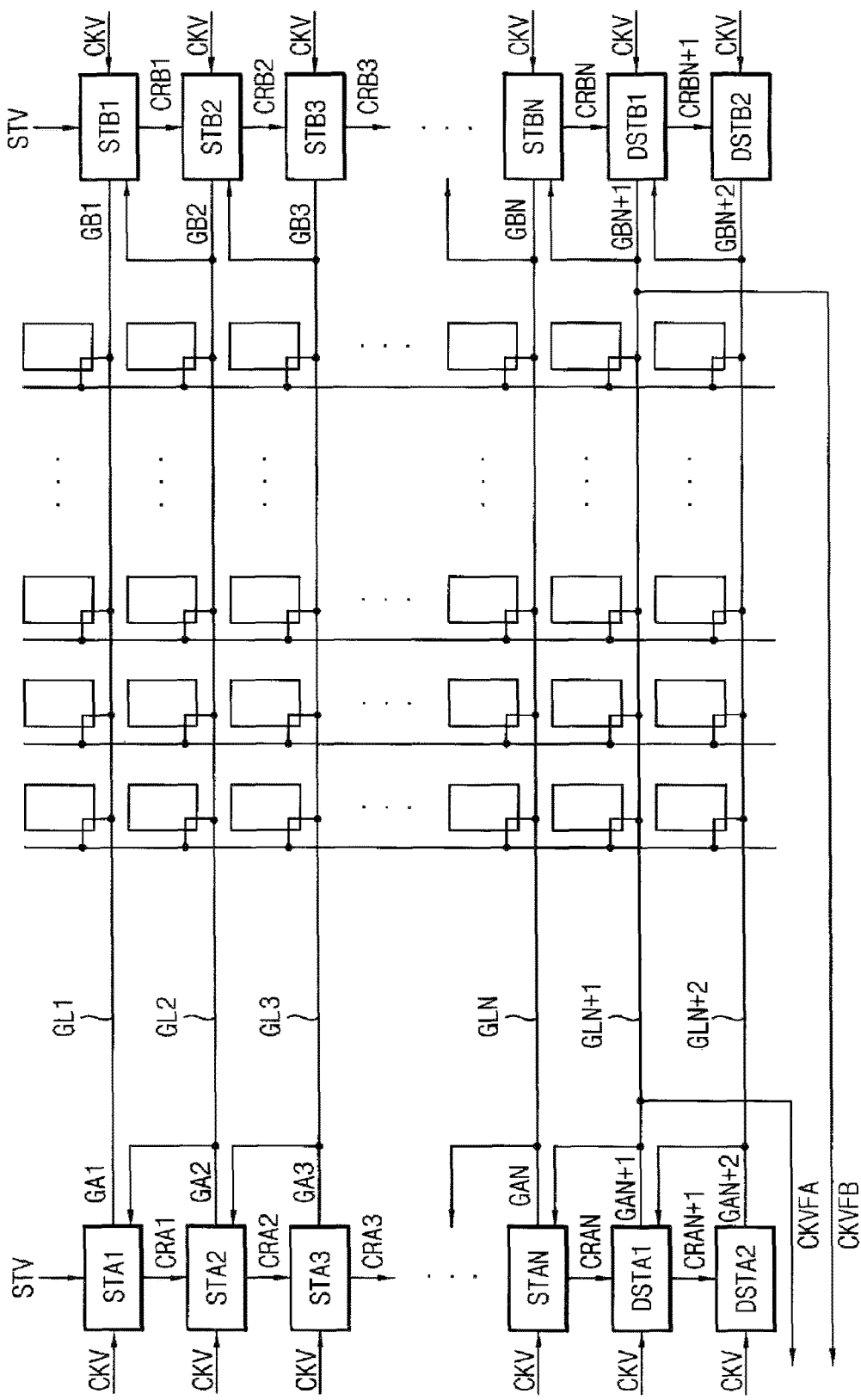
FIG. 8 is a block diagram illustrating stages of the gate driver of FIG. 6.

FIG. 8 is a block diagram illustrating stages of the gate driver of FIG. 6.

Referring to FIGS. 6 to 8, the first gate driving module 120A may include a plurality of the stages from a first stage STAT to an N-th stage STAN. The plurality of the stages are connected to displaying pixels of the display panel 100 through a first end of the plurality of the gate lines, from a first gate line GL1 to an N-th gate line GLN.

The first gate driving module 120A further includes at least a first dummy stage DSTA1 and a second dummy stage DSTA2. The first and second dummy stages DSTA1 and DSTA2 are connected to non-displaying pixels through first ends of (N+1)-th and (N+2)-th gate lines GLN+1 and GLN+2 of the display panel 100. The non-displaying pixels of the display panel 100 do not display any image. Alternatively, the non-displaying pixels of the display panel 100 may display an image, but the image on the non-displaying pixels may be blocked by a light blocking pattern to hide the image on the non-displaying pixels.

The second gate driving module 120B may include a plurality of the stages from a first stage STB1 to an N-th stage STBN. The plurality of the stages are connected to the displaying pixels of the display panel 100 through a second end of the plurality of the gate lines, from the first gate line GL1 to the N-th gate line GLN.

The second gate driving module 120B further includes at least a first dummy stage DSTB1 and a second dummy stage DSTB2. The first and second dummy stages DSTB1 and DSTB2 are connected to the non-displaying pixels through second ends of the (N+1)-th and (N+2)-th gate lines GLN+1 and GLN+2 of the display panel 100.

The error detecting part 220 may receive the gate signal of the dummy stage of the first gate driving module 120A and the gate signal of the dummy stage of the second gate driving module 120B. The error detecting part 220 may determine the status of the gate driver 120A and 120B based on the gate signals of the dummy stages of the first and second gate driving modules 120A and 120B, other than the last dummy stage of both gate driving modules 120A and 120B.

In the present exemplary embodiment, the error detecting part 220 receives a gate signal GNA+1 of the first dummy stage DSTA1 of the first gate driving module 120A as the gate signal CKVFA and a gate signal GNB+1, of the first dummy stage DSTB1 of the second gate driving module 120B as the gate signal CKVFB, to determine the status of the gate driver 120.

Figure 9:
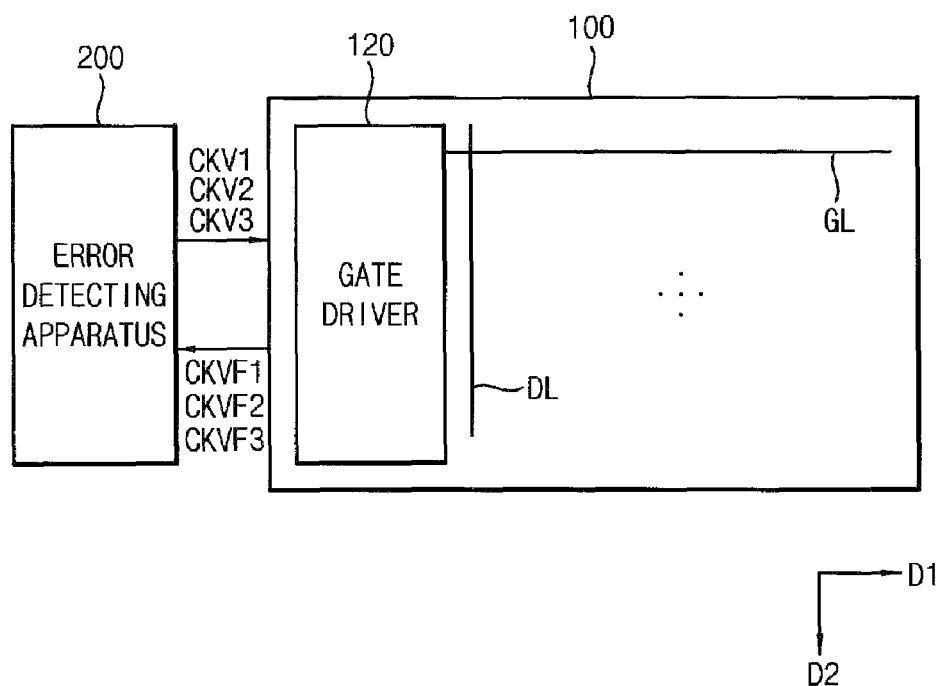
FIG. 9 is a block diagram illustrating a display panel, a gate driver, and an error detecting apparatus according to an exemplary embodiment of the present invention.
Figure 10:
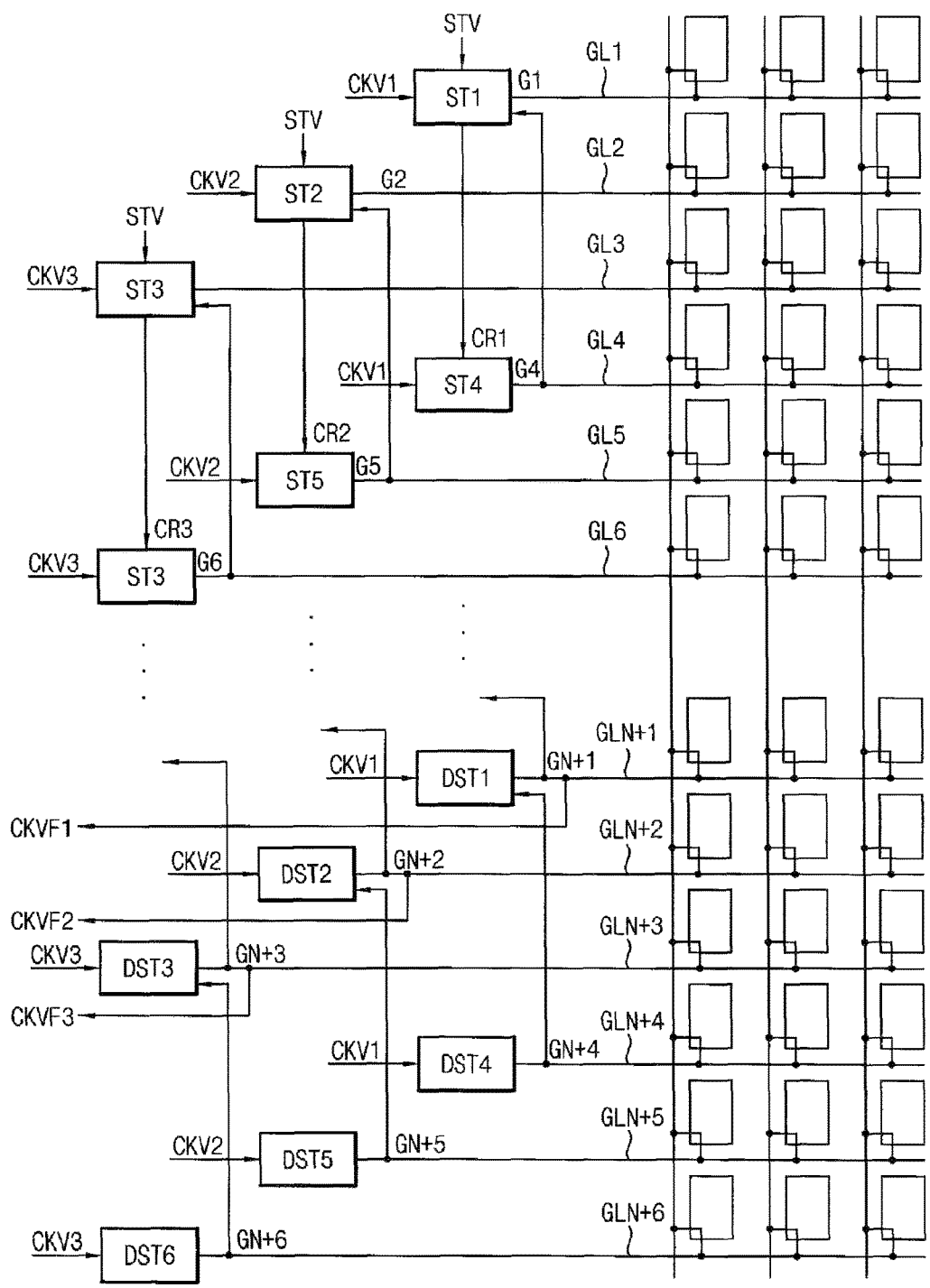
FIG. 10 is a block diagram illustrating stages of the gate driver of FIG. 9.

FIG. 9 is a block diagram illustrating a display panel 100, a gate driver 120 and an error detecting apparatus 200, according to an exemplary embodiment of the present invention. FIG. 10 is a block diagram illustrating stages of the gate driver 120 of FIG. 9.

The display panel, the gate driver, the error detecting apparatus and the method of detecting an error according to the present exemplary embodiment are substantially the same as the display panel, the gate driver, the error detecting apparatus, and the method of detecting an error of the previous exemplary embodiment explained referring to FIGS. 1 to 5B except that the gate driver includes a plurality of channels which are connected to different gate line groups. Thus, the same reference numerals will be used to refer to the same or like parts as those described in the previous exemplary embodiment of FIGS. 1 to 5B and any repetitive explanation concerning the above elements will be omitted.

Referring to FIGS. 9 and 10, the display panel 100 displays an image. The display panel 100 has a display region on which the image is displayed and a peripheral region adjacent to the display region.

The display panel 100 includes a plurality of gate lines GL, a plurality of data lines DL and a plurality of unit pixels connected to the gate lines GL and the data lines DL. The gate lines GL extend in a first direction D1 and the data lines DL extend in a second direction D2 crossing the first direction D1.

The gate driver 120 includes a plurality of gate channels. The gate channels are respectively connected to different gate line groups. In the present exemplary embodiment, the gate driver 120 includes three gate channels and three gate line groups: a first gate channel including ST1, ST4, . . . , DST1, DST4 is connected to a first gate line group including GL1, GL4, . . . , GLN+1, GLN+4; a second gate channel including ST2, ST5, . . . , DST2, DST5 is connected to a second gate line group including GL2, GL5, . . . , GLN+2, GLN+5; and a third gate channel including ST3, ST6, . . . , DST3 and DST6 is connected to a third gate line group including GL3, GL6, . . . , GLN+3, GLN+6.

The gate driver 120 may be provided in any suitable arrangement that allows it to operate as a gate driver. In the present exemplary embodiment, the gate driver 120 may be integrated on the peripheral region of the display panel 100.

The error detecting apparatus 200 determines the status of the gate driver 120. Statuses of the gate driver 120 include a normal status and an error status.

The error detecting apparatus 200 may output a first clock signal CKV1 to the first gate channel, a second clock signal CKV2 to the second gate channel, and a third clock signal CKV3 to the third gate channel. The first clock signal CKV1, the second clock signal CKV2 and the third clock signal CKV3 may have timings different from one another. The error detecting apparatus 200 receives a gate signal CKVF1 from the first gate channel, a gate signal CKVF2 from the second gate channel and a gate signal CKVF3 from the third gate channel to determine the status of the gate driver 120.

The error detecting part 220 may determine that the gate signal from the gate driver 120 is an error signal when at least one of the gate signals CKVF1, CKVF2, and CKVF3 from the three gate channels is an error signal.

The error detecting part 220 may determine that the gate driver 120 is in the error status when the number of normal gate signals from the gate driver 120 is less than a threshold normal value within a number of frames. Alternatively, the error detecting part 220 may determine that the gate driver 120 is in the error status when the number of normal gate signals is equal to or greater than a threshold error value.

The first gate channel includes the first stage to the (3K−2)-th stage, wherein K is a positive integer. The first stage to the (3K−2)-th stage are connected to displaying pixels of the display panel 100 through the first gate line to the (3K−2)-th gate line, respectively.

The first gate channel further includes a first dummy stage DST1 and a second dummy stage DST4. The first and second dummy stages DST1 and DST2 are respectively connected to non-displaying pixels through (N+1)-th and (N+4)-th gate lines GLN+1 and GLN+4 of the display panel 100, wherein N is a positive integer equal to 3K. The non-displaying pixels of the display panel 100 do not display any image. Alternatively, the non-displaying pixels of the display panel 100 may display an image, but the image on the non-displaying pixels may be blocked by a light blocking pattern to hide the image on the non-displaying pixels.

The second gate channel includes the second stage to the (3K−1)-th stage. The second stage to the (3K−1)-th stage are connected to displaying pixels of the display panel 100 through the second gate line to the (3K−1)-th gate line, respectively.

The second gate channel further includes a first dummy stage DST2 and a second dummy stage DST5. The first and second dummy stages DST2 and DST5 are connected to non-displaying pixels through (N+2)-th and (N+5)-th gate lines GLN+2 and GLN+5 of the display panel 100, respectively.

The third gate channel includes the third stage to the 3K-th stage. The third stage to the 3K-th stage are connected to displaying pixels of the display panel 100 through the third gate line to the 3K-th gate line.

The third gate channel further includes a first dummy stage DST3 and a second dummy stage DST6. The first and second dummy stages DST3 and DST6 are connected to non-displaying pixels through (N+3)-th and (N+6)-th gate lines GLN+3 and GLN+6 of the display panel 100, respectively.

The error detecting part 220 may receive the gate signal of the dummy stage of the first gate channel, the gate signal of the dummy stage of the second gate channel and the gate signal of the dummy stage of the third gate channel. The error detecting part 220 may determine the status of the gate driver 120 based on the gate signals of the dummy stages of the first to third gate channels, other than the last dummy stages of the respective gate channels.

In the present exemplary embodiment, the error detecting part 220 receives a gate signal GN+1 of the first dummy stage DST1 of the first gate channel as the gate signal CKVF1, a gate signal GN+2 of the first dummy stage DST2 of the second gate channel as the gate signal CKVF2, and a gate signal GN+3 of the first dummy stage DST3 of the third gate channel as the gate signal CKVF3 to determine the status of the gate driver 120.

Figure 11:
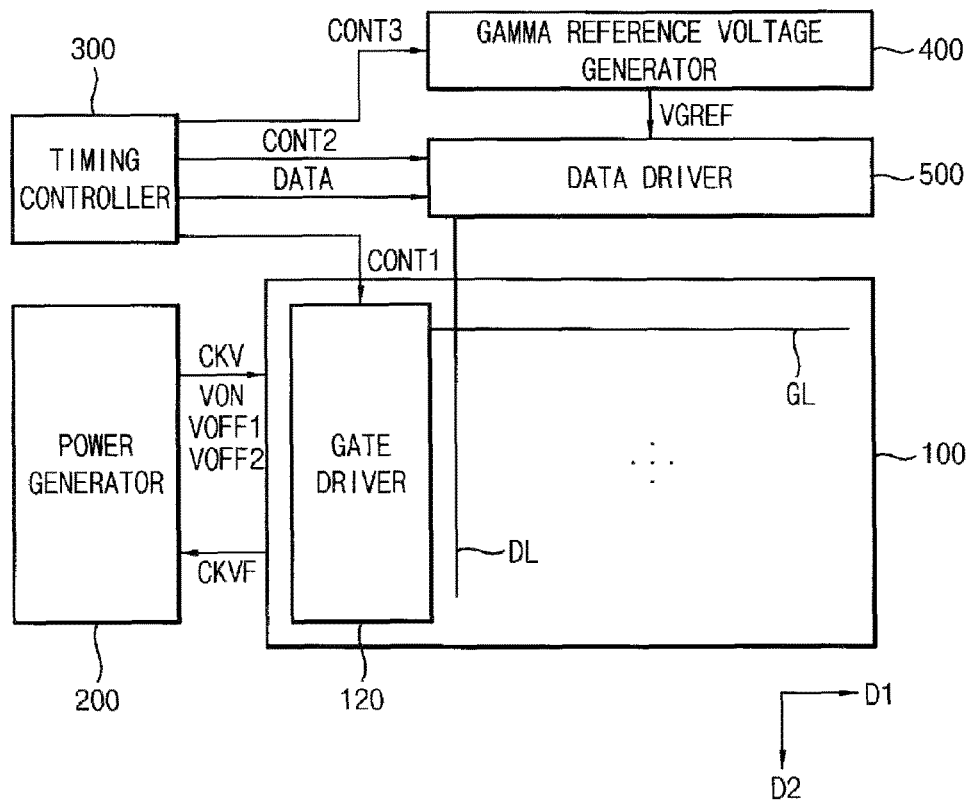
FIG. 11 is a block diagram illustrating a display apparatus according to an exemplary embodiment of the present invention.
Figure 12:
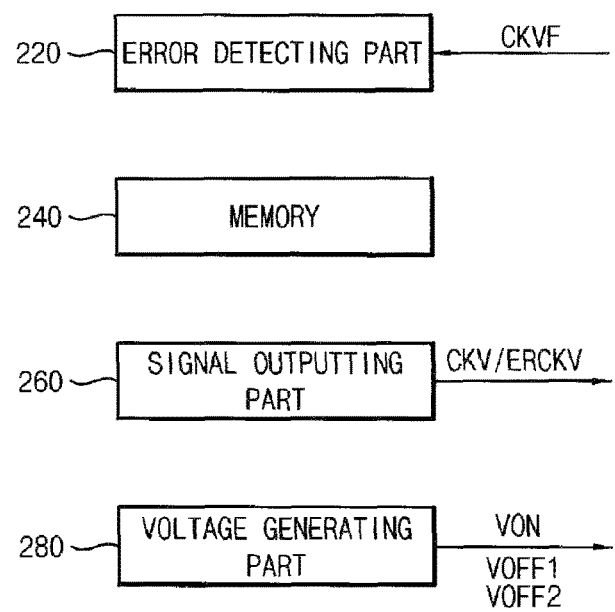
FIG. 12 is a block diagram illustrating a power generator of FIG. 11.

FIG. 11 is a block diagram illustrating a display apparatus according to an exemplary embodiment of the present invention. FIG. 12 is a block diagram illustrating a power generator of FIG. 11.

Referring to FIGS. 11 and 12, the display apparatus includes a display panel 100, a gate driver 120, a power generator 200, a timing controller 300, a gamma reference voltage generator 400 and a data driver 500.

In exemplary embodiments, the gate driver 120, the power generator 200, the time controller 300, the gamma reference voltage generator 400, data driver 500, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to exemplary embodiments, the features, functions, and/or processes described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the gate driver 120, the power generator 200, the time controller 300, the gamma reference voltage generator 400, data driver 500, and/or one or more components thereof may include or otherwise be associated with one or more memories (not shown) including code (e.g., instructions) configured to cause the gate driver 120, the power generator 200, the time controller 300, the gamma reference voltage generator 400, data driver 500, and/or one or more components thereof to perform one or more of the features, functions, and/or processes described herein.

The memories may be any medium that participates in providing code/instructions to the one or more software, hardware, and/or firmware components for execution. Such memories may take many forms, including but not limited to non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

The display apparatus according to the present exemplary embodiment includes the display panel, the gate driver and the error detecting apparatus of the previous exemplary embodiment explained referring to FIGS. 1 to 5B. Thus, the same reference numerals will be used to refer to the same or like parts as those described in the previous exemplary embodiment of FIGS. 1 to 5B and any repetitive explanation concerning the above elements will be omitted. Referring to FIG. 11, the timing controller 300 may receive an input image data and an input control signal from an external apparatus. The input image data may include red image data, green image data and blue image data. The input control signal may include a master clock signal and a data enable signal. The input control signal may further include a vertical synchronizing signal and a horizontal synchronizing signal.

In the current exemplary embodiment of the invention, the timing controller 300 generates a first control signal CONT1, a second control signal CONT2, a third control signal CONT3 and a data signal DATA based on the input image data and the input control signal.

The first control signal CONT1 is generated based on the input control signal, and transmitted to the gate driver 120 to control the operation of the gate driver 120. The first control signal CONT1 may further include a vertical start signal and a gate clock signal. The second control signal CONT2 is generated based on the input control signal, and transmitted to the data driver 500 to control the operation of the data driver 500. The second control signal CONT2 may include a horizontal start signal and a load signal. The data signal DATA is generated based on the input image data and transmitted to the data driver 500. The third control signal CONT3 is transmitted to the gamma reference voltage generator 400 to control the operation of the gamma reference voltage generator 400 based on the input control signal.

The gate driver 120 generates gate signals driving the gate lines GL in response to the first control signal CONT1 received from the timing controller 300. The gate driver 120 sequentially outputs the gate signals to the gate lines GL.

The gamma reference voltage generator 400 generates a gamma reference voltage VGREF based on the third control signal CONT3 received from the timing controller 300. The gamma reference voltage generator 400 provides the gamma reference voltage VGREF to the data driver 500. The value of the gamma reference voltage VGREF corresponds to a level of the data signal DATA. In an exemplary embodiment, the gamma reference voltage generator 400 may be disposed in the timing controller 300 or in the data driver 500.

The data driver 500 receives the second control signal CONT2 and the data signal DATA from the timing controller 300, and receives the gamma reference voltage VGREF from the gamma reference voltage generator 400. The data driver 500 converts the data signal DATA into analog data voltages based on the gamma reference voltages VGREF. The data driver 500 outputs the data voltages to the data lines DL.

The data driver 500 may be directly mounted on the display panel 100, or be connected to the display panel 100 in a TCP type. The data driver 500 may also be integrated on the peripheral region of the display panel 100. In short, the data driver 500 may be provided in any suitable arrangement that allows it to operate as a data driver.

Referring to the FIG. 12, the power generator 200 includes an error detecting part 220, a memory 240, a signal outputting part 260, and a voltage generating part 280.

The error detecting part 220 receives the gate signal CKVF from the gate driver 120 to determine the status of the gate driver 120. The memory 240 stores the status of the gate driver 120 determined by the error detecting part 220.

The signal outputting part 260 may selectively output a clock signal CKV and an error signal ERCKV based on the status of the gate driver 120 stored in the memory 240.

The voltage generating part 280 may generate a gate on voltage VON, a first gate off voltage VOFF1, and a second gate off voltage VOFF2, and transmit them to the gate driver 120. The voltage generating part 280 may further generate a power voltage for the data driver 500 and output the power voltage to the data driver 500.

According to the present exemplary embodiment, the power generator 200 of the display apparatus may directly receive the signal of the gate driver 120 and detect the error status of the gate driver 120. Thus, a reliability of the display apparatus may be improved.

Figure 13:
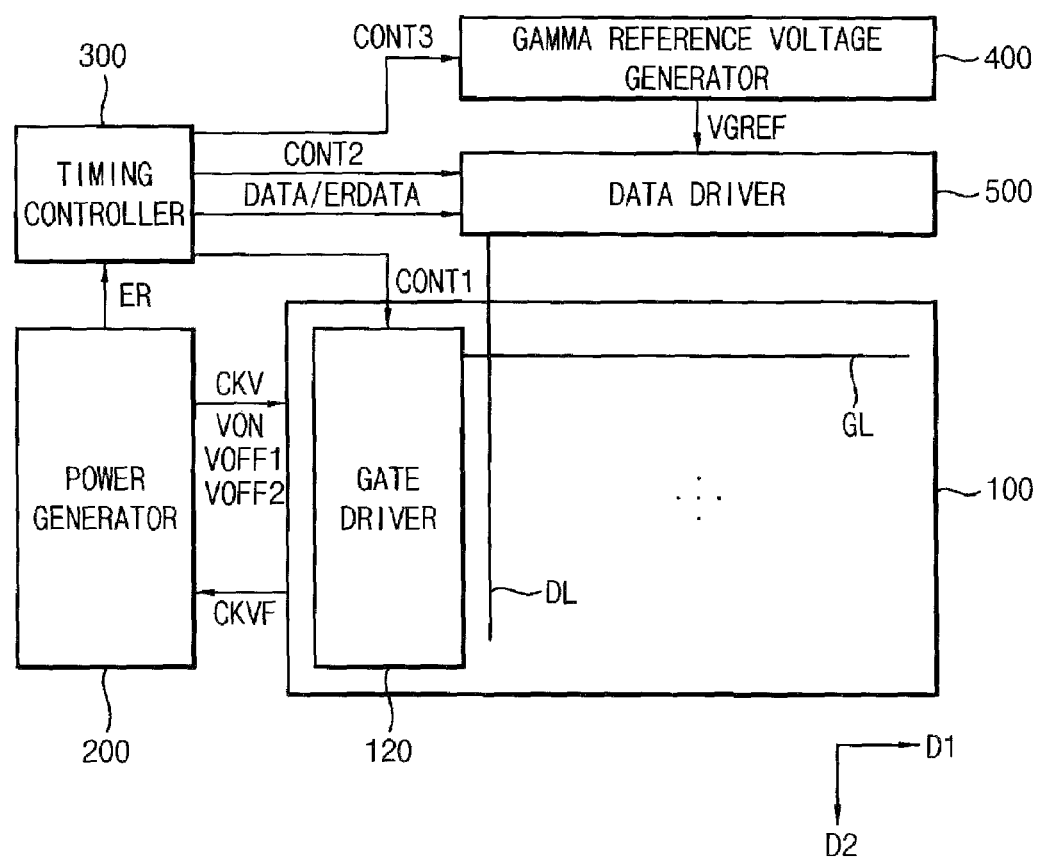
FIG. 13 is a block diagram illustrating a display apparatus according to an exemplary embodiment of the present invention.

FIG. 13 is a block diagram illustrating a display apparatus according to an exemplary embodiment of the present invention.

The display apparatus according to the present exemplary embodiment are substantially the same as the display apparatus of the previous exemplary embodiment explained referring to FIGS. 11 and 12 except that the power generator outputs an error signal ER to the timing controller. Thus, the same reference numerals will be used to refer to the same or like parts as those described in the previous exemplary embodiment of FIGS. 11 and 12 and any repetitive explanation concerning the above elements will be omitted.

Referring to FIG. 13, the display apparatus includes a display panel 100, a gate driver 120, a power generator 200, a timing controller 300, a gamma reference voltage generator 400 and a data driver 500.

The timing controller 300 generates a first control signal CONT1, a second control signal CONT2, a third control signal CONT3 and a data signal DATA based on the input image data and the input control signal.

The first control signal CONT1 is generated based on the input control signal, and transmitted to the gate driver 120 to control the operation of the gate driver 120. The first control signal CONT1 may further include a vertical start signal and a gate clock signal. The second control signal CONT2 is generated based on the input control signal, and transmitted to the data driver 500 to control the operation of the data driver 500. The second control signal CONT2 may include a horizontal start signal and a load signal. The data signal DATA is generated based on the input image data, and transmitted to the data driver 500.

The power generator 200 includes an error detecting part 220, a memory 240, a signal outputting part 260, and a voltage generating part 280.

The error detecting part 220 receives the gate signal CKVF from the gate driver 120 to determine the status of the gate driver 120.

The memory 240 stores the status of the gate driver 120 determined by the error detecting part 220.

The signal outputting part 260 outputs a clock signal CKV to the gate driver 120. When the status of the gate driver 120 stored in the memory 240 is the error status, the signal outputting part 260 outputs an error signal ER to the timing controller 300.

The timing controller 300 may selectively output the data signal DATA and an error data signal ERDATA to the data driver 500 based on the error signal ER.

In an exemplary embodiment the timing controller 300 outputs the data signal DATA to the data driver 500 if the timing controller 300 does not receive the error signal ER. On the other hand, the timing controller 300 outputs the error data signal ERDATA to the data driver 500 if the timing controller 300 receives the error signal ER. The error data signal ERDATA represents that the display panel 100 with the integrated gate driver 120 is defective. The error data signal ERDATA may be a text signal representing that the error occurred.

The voltage generating part 280 may generate a gate on voltage VON, a first gate off voltage VOFF1 and a second gate off voltage VOFF2 and transmit them to the gate driver 120. The voltage generating part 280 may further generate a power voltage for the data driver 500 and output the power voltage to the data driver 500.

According to the present exemplary embodiment, the power generator 200 of the display apparatus may directly receive the signal of the gate driver 120 and detect the error status of the gate driver 120. Thus, a reliability of the display apparatus may be improved.

Figure 14:
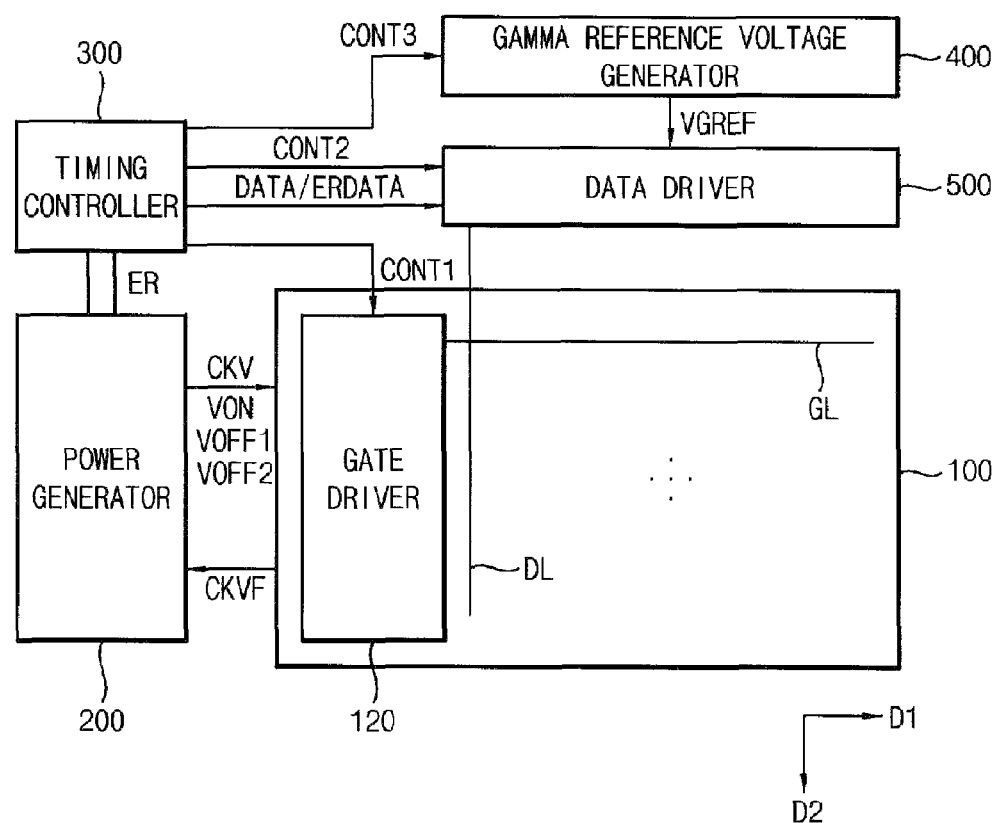
FIG. 14 is a block diagram illustrating a display apparatus according to an exemplary embodiment of the present invention.

FIG. 14 is a block diagram illustrating a display apparatus according to an exemplary embodiment of the present invention.

The display apparatus according to the present exemplary embodiment are substantially the same as the display apparatus of the previous exemplary embodiment explained referring to FIGS. 11 and 12 except that the timing controller may directly determine the status of the gate driver from the memory. Thus, the same reference numerals will be used to refer to the same or like parts as those described in the previous exemplary embodiment of FIGS. 11 and 12 and any repetitive explanation concerning the above elements will be omitted.

Referring to FIG. 14, the display apparatus includes a display panel 100, a gate driver 120, a power generator 200, a timing controller 300, a gamma reference voltage generator 400 and a data driver 500.

The timing controller 300 generates a first control signal CONT1, a second control signal CONT2, a third control signal CONT3 and a data signal DATA based on the input image data and the input control signal.

The first control signal CONT1 is generated based on the input control signal, and transmitted to the gate driver 120 to control the operation of the gate driver 120. The first control signal CONT1 may further include a vertical start signal and a gate clock signal. The second control signal CONT2 is generated based on the input control signal, and transmitted to the data driver 500 to control the operation of the data driver 500. The second control signal CONT2 may include a horizontal start signal and a load signal. The data signal DATA is generated based on the input image data, and transmitted to the data driver 500.

The power generator 200 includes an error detecting part 220, a memory 240, a signal outputting part 260, and a voltage generating part 280.

The error detecting part 220 receives the gate signal CKVF from the gate driver 120 to determine the status of the gate driver 120.

The memory 240 stores the status of the gate driver 120 determined by the error detecting part 220.

The signal outputting part 260 outputs a clock signal CKV to the gate driver 120.

In the present exemplary embodiment, the timing controller 300 may directly determine the status ER of the gate driver 120 from the memory 240. For example, the timing controller 300 may read the flag value representing the status of the gate driver 120 from the memory 240 to determine the status ER of the gate driver 120; or, the timing controller 300 may communicate with the memory 240 by I2C communication method to determine the status ER of the gate driver 120.

The timing controller 300 may selectively output the data signal DATA and an error data signal ERDATA to the data driver 500 based on the status ER of the gate driver 120.

In one exemplary embodiment, the timing controller 300 may output the data signal DATA to the data driver 500 when the gate driver 120 is in normal status. On the other hand, the timing controller 300 may output the error data signal ERDATA to the data driver 500 when the gate driver 120 is in error status. The error data signal ERDATA represents that the display panel 100 with the integrated gate driver 120 is defective. The error data signal ERDATA may be a text signal representing the error occurred.

The voltage generating part 280 may generate a gate on voltage VON, a first gate off voltage VOFF1 and a second gate off voltage VOFF2 and transmits them to the gate driver 120. The voltage generating part 280 may further generate a power voltage for the data driver 500 and output the power voltage to the data driver 500.

According to the present exemplary embodiment, the power generator 200 of the display apparatus may directly receive the signal of the gate driver 120 and detect the error status of the gate driver 120. Thus, a reliability of the display apparatus may be improved.

According to the present invention as explained above, the error status of the gate driver may be certainly detected so that a reliability of the display apparatus may be improved.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. An error detecting apparatus comprising:
    an error detecting part configured to receive a gate signal of a gate driver and determine whether a status of the gate driver is in a normal status or an error status based on the gate signal;
    a memory configured to store the status of the gate driver determined by the error detecting part; and
    a signal outputting part configured to selectively transmit one of a clock signal and an error signal to the gate driver, based on the status of the gate driver stored in the memory.

2. The error detecting apparatus of claim 1, wherein the error detecting part is configured to determine the status of the gate driver when the error detecting apparatus is connected to the gate driver.

3. The error detecting apparatus of claim 1, wherein the error detecting part is configured to determine the gate signal of the gate driver as a normal signal when, in a single frame, the gate signal of the gate driver has a single pulse that exceeds a threshold voltage.

4. The error detecting apparatus of claim 3, wherein the error detecting part is configured to determine the status of the gate driver as the error status when a number of the normal signals in a number of frames is less than a threshold normal value.

5. The error detecting apparatus of claim 1, wherein the error detecting part is configured to receive a gate signal of a dummy stage of the gate driver to determine the status of the gate driver, the dummy stage being connected to non-displaying pixel of a display panel.

6. A display apparatus comprising:
    a display panel comprising a gate line, a data line, and a pixel;
    a data driver configured to apply a data voltage to the data line;
    a gate driver configured to apply a gate signal to the gate line; and
    an error detecting apparatus comprising:
        an error detecting part configured to receive the gate signal and determine whether a status of the gate driver is a normal status or an error status based on the gate signal;
        a memory configured to store the status of the gate driver determined by the error detecting part; and
        a signal outputting part configured to selectively transmit one of a clock signal and an error signal to the gate driver, based on the status of the gate driver stored in the memory.

7. The display apparatus of claim 6, wherein the error detecting part is configured to determine the status of the gate driver when the error detecting apparatus is connected to the gate driver.

8. The display apparatus of claim 6, wherein the error detecting part is configured to determine the gate signal of the gate driver as a normal signal when, in a single frame, the gate signal of the gate driver has a single pulse that exceeds a threshold voltage.

9. The display apparatus of claim 8, wherein the error detecting part is configured to determine the status of the gate driver as the error status when a number of the normal signals in a number of frames is less than a threshold normal value.

10. The display apparatus of claim 6, wherein the error detecting part is configured to receive a gate signal of a dummy stage of the gate driver to determine the status of the gate driver, the dummy stage being connected to non-displaying pixels of the display panel.

11. The display apparatus of claim 6, wherein the gate driver is integrated on the display panel.

12. The display apparatus of claim 6, wherein the gate driver comprises a first gate driving module disposed at a first side of the display panel and a second gate driving module disposed at a second side of the display panel opposite to the first side of the display panel, and
    the error detecting part is configured to receive a gate signal of a dummy stage of the first gate driving module and a gate signal of a dummy stage of the second gate driving module to determine the status of the gate driver, both dummy stages of the first and second gate driving module being connected to non-displaying pixels of the display panel.

13. The display apparatus of claim 12, wherein the error detecting part is configured to determine the status of the gate driver as the error status when at least one of the first gate driving module and the second gate driving module has the error status.

14. The display apparatus of claim 6, wherein the gate driver comprises a plurality of gate channels connected to different gate line groups, and
    the error detecting part is configured to receive a gate signal of a dummy stage of each gate channel to determine the status of the gate driver, the dummy stages being connected to non-displaying pixels of the display panel.

15. The display apparatus of claim 14, wherein the error detecting part is configured to determine the status of the gate driver as the error status when at least one of the channels has the error status.

16. The display apparatus of claim 6, further comprising a timing controller configured to output a first control signal to the gate driver and a second control signal and a data signal to the data driver.

17. The display apparatus of claim 16, wherein the signal outputting part is configured to output the error signal to the timing controller, and
the timing controller is configured to selectively output the data signal and an error data signal to the data driver based on the error signal.

18. The display apparatus of claim 16, wherein the timing controller is configured to directly determine the status of the gate driver from the memory and selectively output the data signal and an error data signal to the data driver based on the status of the gate driver.

19. A method of detecting an error of a gate driver, the method comprising:
determining whether a status of the gate driver is a normal status or an error status based on a gate signal of the gate driver;
storing the status of the gate driver at a memory; and
selectively transmitting one of a clock signal and an error signal to the gate driver, based on the status of the gate driver stored in the memory.

* * * * *